United States Patent
Heinig, Jr.

(10) Patent No.: US 6,524,540 B1
(45) Date of Patent: Feb. 25, 2003

(54) MATERIALS AND METHODS FOR WATER PURIFICATION

(75) Inventor: Charles F. Heinig, Jr., Providence, RI (US)

(73) Assignee: Biocatalytica Incorporated, Pawtucket, RI (US)

( * ) Notice: Subject to any disclaimer, the term of this patent is extended or adjusted under 35 U.S.C. 154(b) by 0 days.

(21) Appl. No.: 09/612,862

(22) Filed: Jul. 10, 2000

Related U.S. Application Data

(60) Provisional application No. 60/142,828, filed on Jul. 8, 1999.

(51) Int. Cl.$^7$ ................................................ B01J 23/00
(52) U.S. Cl. ........................ 422/211; 422/213; 502/300; 502/325; 502/330; 502/339; 502/344; 502/347
(58) Field of Search ................................ 502/300, 325, 502/330, 339, 344, 347; 422/211, 213; 210/764

(56) References Cited

U.S. PATENT DOCUMENTS

| | | | |
|---|---|---|---|
| 4,225,561 A | * | 9/1980 | Torres |
| 4,504,387 A | | 3/1985 | LeMire et al. ............... 210/101 |
| 4,608,247 A | | 8/1986 | Heinig, Jr. ................... 424/16 |
| 5,192,452 A | * | 3/1993 | Mitsui et al. |
| 5,288,313 A | * | 2/1994 | Portner |
| 5,338,463 A | * | 8/1994 | Yan |
| 5,352,369 A | | 10/1994 | Heinig, Jr. ................... 210/760 |
| 5,413,984 A | * | 5/1995 | Marecot et al. |
| 5,660,802 A | | 8/1997 | Archer et al. ................ 422/261 |
| 5,879,645 A | | 3/1999 | Parker et al. ............. 423/213.2 |
| 6,267,895 B1 | * | 7/2001 | Englehard et al. |

FOREIGN PATENT DOCUMENTS

WO WO 97/37939 10/1997

* cited by examiner

Primary Examiner—Betsey Morrison Hoey

(57) ABSTRACT

A catalyst for the purification, e.g., disinfection, of water is disclosed. The catalyst of the invention comprises a substrate, a first metal, and at least one additional metal. The metals are codeposited on the substrate to form a unified structure. Methods of using the catalyst to disinfect water and devices for the purification of water are also disclosed.

37 Claims, 1 Drawing Sheet

MATERIALS AND METHODS FOR WATER PURIFICATION

RELATED APPLICATIONS

This application claims priority to U.S. Provisional Application Serial No. 60/142,828, entitled "Novel Materials and Methods for Water Disinfection," filed on Jul. 8, 1999, the entire contents of which are hereby incorporated herein by reference.

BACKGROUND OF THE INVENTION

In developed countries, it is recognized that water should be treated to kill various microorganisms before being used municipally. It is also recognized that water should be treated effectively before it can be used in swimming pools, hot tubs and spas. Bodies of water such as swimming pools, hot tubs and spas are highly susceptible to rapid microorganism growth. These bodies of water can rapidly become extremely hazardous to users, unless the water is effectively and continuously treated against micro-organisms.

One common method of treating water against microorganisms is to add chlorine to render the water safe for human consumption and/or use in swimming pools, spas, etc. Normally, chlorine is added to the water in the form of hypochlorite salt or chlorine gas. However, it has been found that chlorine has both an objectionable odor and can cause skin irritations and serious eye irritations to users.

Because of the objectionable physical properties of chlorine, a number of alternate water treatment systems which operate without chlorine have been developed in recent years. One type of alternative water treatment system is a system in which silver ions are added to water to kill the bacteria (see, for example, U.S. Pat. Nos. 4,608,247 and 5,352,369). However, it has been found that, in many cases, systems of this type are only partially effective, and amounts of chlorine must be added to water for complete disinfection.

SUMMARY OF THE INVENTION

In one embodiment, the invention pertains to a catalyst for purifying water. The catalyst comprises a substrate, a first metal, and at least one additional metal. The first metal and the additional metals are codeposited onto the substrate. In one further embodiment, the substrate is alumina, the first metal is silver, and the additional metals are selected from the group consisting of platinum, palladium, vanadium, molybdenum, or another transition metal or rare earth metal. Advantageously, the catalyst is capable of disinfecting water such that it meets or exceeds water safety standards.

The invention also pertains to a catalyst for purifying water, comprising a substrate, silver, and palladium. The palladium and silver are codeposited onto the substrate and form a unified structure on the surface of the substrate.

The invention also pertains to a method for purifying water, by contacting water with the catalyst of the invention, such that the water is purified. In one embodiment, purifying the water comprises disinfecting the water.

The invention also includes a method for inactivating microorganisms in water. The method includes contacting the water with a catalyst of the invention, such that the bacteria are inactivated.

The invention also pertains to a device for purifying water comprising the catalyst of the invention. In a further embodiment, the device includes a water inlet, water outlet and a housing which contains the catalyst.

The invention also includes a packaged catalyst for the disinfection of water. The packaged catalyst includes the catalyst of the invention, a container and instructions for using the catalyst for purifying water.

DETAILED DESCRIPTION OF THE INVENTION

Figure 1A:
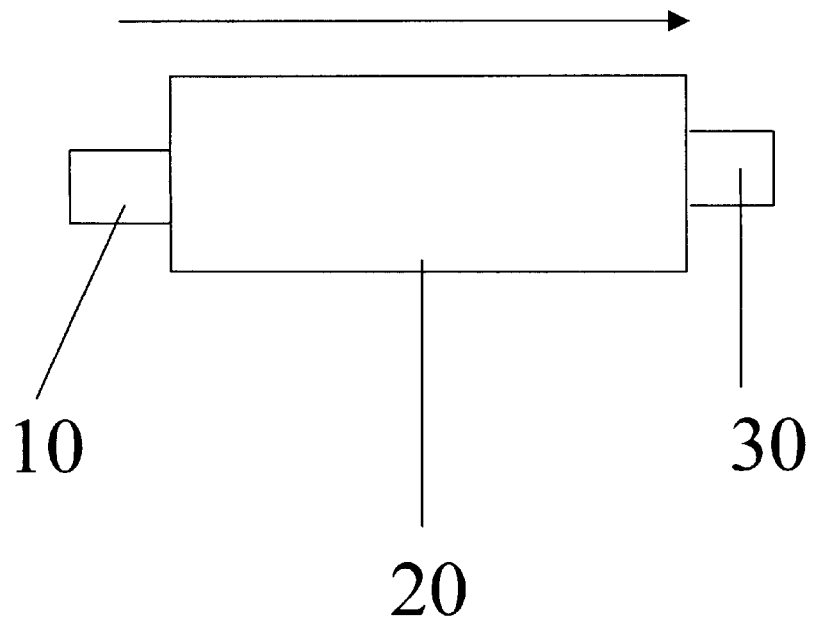
FIGS. 1A and 1B show a schematic diagram of a device for catalytic water disinfection.

The present invention pertains, at least in part, to methods, catalysts and devices useful for the purification, e.g., disinfection, of water. Techniques of water disinfection by a single metal, such as silver, are known. The known techniques exploit the catalytic ability of silver to react with oxygen dissolved in water to generate reactive chemical species that kill or inactivate bacteria, viruses and protozoa.

This invention improves on the known methods of disinfecting water by single metal catalysis by incorporating at least one additional metal, either in its native metallic form or as its oxide. Incorporation of at least one additional metal improves the performance of the catalyst by allowing the disinfection process to be faster, simpler, more effective, and less cumbersome.

I. Definitions

Before further description of the invention, certain terms employed in the specification, examples and appended claims are, for convenience, collected here.

The term "codeposition" includes methods where two or more metals are deposited on the substrate in such a manner that they form a unified structure which comprises atoms of both of the metals.

Metals can be codeposited on the substrate by a number of methods known in the art including, for example, electro-codeposition, hydrogen gas reduction, thermal reduction, and methods using chemical reducing agents such as sodium dithionate and ascorbic acid. In an embodiment, the metals are codeposited on the substrate such that they exist in their ground states and/or capable of acting as proton/electron acceptors.

The term "disinfect" or "disinfecting" includes the killing or inactivation of pathogenic and other microorganisms, such as bacteria, viruses, fungi, and protozoa that pollute water supplies. Preferably, the catalyst of the invention disinfects water such that the resulting disinfected water meets or exceeds standards for water purity established by various organizations and/or agencies including, for example, the American Organization of Analytical Chemists (AOAC), the World Health Organization, and the United States Environmental Protection Agency (EPA). Advantageously, water disinfected by the catalysts and methods of the invention meets these without the addition of further disinfecting agents, e.g., chlorine or bromine.

The term "housing" includes any material in which the catalyst can be placed, such that the catalyst is capable of performing its intended function, e.g., purifying water. Examples of housings for the catalyst include porous bags, tubes, and other structures suitable for water purification devices. The housing for the catalyst can be adapted for a specific use. For example, the housing may be tubular, for pumping water through the catalyst, or a porous bag for "flow through" applications.

The term "inactivate" or "inactivation" includes rendering a microorganism non-pathogenic pathogenic to humans or other animals, for example, by killing the microorganisms. The microorganisms, such as bacteria, are killed through interactions with reactive oxidative species generated by the catalyst of the invention. For viruses, the oxidative species are believed to cause structural changes to the viral protein capsids which compromise the reproductive ability of the virus to inject genetic material into host cells. The mechanism for bacteria and protozoa is identical to that for chlorine and other oxidizers.

The term "kill rate" refers to the number of bacteria per volume of water over time that the catalyst can effectively kill or inactivate. The kill rate can be determined by using the method outlined in Example 1. The kill rate of the catalyst of the invention is 1,000 organisms/mL per fifteen seconds, or greater, 10,000 organisms/mL per fifteen seconds, or greater, 100,000 organisms/mL per fifteen seconds, or greater, or, advantageously, 1,000,000 organisms/mL per fifteen seconds, or greater.

The term "metal" includes elements or compounds that when deposited on a substrate in combination with another metal are capable of disinfecting water. Examples of catalytic metals include transition metals, platinides, rare earth elements, and oxides of transition metals, platinides, and rare earth elements. In certain embodiments, the metals are not radioactive nor otherwise toxic to humans when present in trace amounts.

The term "microorganism" includes bacteria, fungi, protozoa, viruses and other biological entities and pathogenic species which can pollute water supplies. Examples of microorganisms include bacteria such as *Escherichia coli, Streptococcus faecalis, Legimella pneumophila, Yersinia enterocolitica, Staphylococcus aureus, Pseudomonas aeruginosa Klebsiella terrigena* and *Salmonella typhi*. Examples of viruses include hepatitis A and other viruses which are advantageous to inactivate. Examples of fungi include many species, including those which are not pathogenic but are advantageously removed to improve the aesthetic properties of the water. Examples of protozoa include *Enteroamoebae, Giardia, Cryptosporidium parvum etc.*

The term "platinides" includes platinum, palladium, iridium and other elements which display similar electrochemical properties.

The term "purify" or "purifying" includes disinfection of the water (e.g., killing or inactivation of microorganisms), as well as the optional removal or inactivation of other contaminants in the water. Examples of contaminants include particulate matter, minerals, organic chemicals, etc.

The term "rare earth elements" include, for example, lanthanum, cerium, praseodymium, neodymium, promethium, samarium, europium, gadolinium, terbium, dysprosium, holmium, erbium, thulium, ytterbium, and lutetium.

The term "redox potential" refers to the ability of the catalyst to transfer electrons to dissolved oxygen in the water source, thus forming reactive oxygen species. The redox potential of a catalyst can be determined by methods known in the art. One example of a method used to determine the redox potential of a catalyst is to expose N,N-diethyl-1,4-phenylenediamine (DPD, Fischer Scientific) to the catalyst in oxygen free water. The redox potential of the catalyst can also be determined through the use of electronic devices known in the art, for example, through the use of commercially available electronic redox electrodes.

The term "substrate" includes any solid onto which the catalyst of the invention can be deposited, such that the catalyst is able to perform its intended function, e.g., disinfect water. In an embodiment, the substrate has a high surface area, e.g., is highly porous. Examples of substrates include metal oxides, such as, for example, alumina, silica or titanium dioxide.

The term "transition metal" includes, for example, scandium, titanium, vanadium, chromium, manganese, iron, cobalt, nickel, copper, zinc, gallium, germanium, ytterbium, zirconium, niobium, technetium, ruthenium, rhodium, palladium, molybdenum, silver, cadmium, indium, tin, antimony, hafnium, tantalum, tungsten, rhenium, osmium, iridium, platinum, gold, mercury, thallium, etc. Preferred transition metals include those capable of electron donation and/or electron accepting, as well as those which are not fatally toxic in trace amounts and non-radioactive. Examples of advantageous transition metals include silver, palladium, platinum, vanadium, and molybdenum.

The term "unified structure" includes structures which allow the catalyst to perform its intended function, e.g. disinfecting water. Advantageously, the atoms of each of the metals are codeposited on the substrate, such that they are evenly dispersed over the surface of the substrate. For example, the metal present in lower quantities (the "additional metal", e.g., palladium) is integrated in to the metal lattice of the metal which is present in larger quantities (the "first metal", e.g., silver).

The term "water safety standards" includes standards issued by the American Organization of Analytical Chemists (AOAC, International), for water consumption by humans, for water consumption by animals, and swimming. The standards given by the AOAC, International are 1,000,000 kill of *E. coli* per mL in 15 fifteen seconds. Other water safety standards include those issued by the World Health Organization (WHO, see *Guidelines for Drinking Water Quality*) and the United States Environmental Protection Agency (EPA, See Publication No. 570/9/76-003). The water purified by the methods of the invention meets both the WHO and the EPA standards for potable water, as well as the standards established for recreational water (swimming pools, spas, etc.).

II. Catalysts of the Invention

In one embodiment, the invention pertains to a catalyst for disinfecting water. The catalyst comprises a substrate, a first metal, and at least one additional metal. Advantageously, the first metal and the additional metals are codeposited on the substrate, such that they form a unified structure. The presence of one or more additional metals, such as palladium, significantly increases the efficacy of the catalyst. Examples of substrates include, for example, metal oxides such as alumina.

Without being bound or limited by theory, it is believed that at least one of the metals may function as an electron acceptor, while the other may function as proton acceptor. It is further believed that increased efficiency of electron transfer on the surface of the catalyst leads to enhanced ability of the catalyst to generate reactive species and, therefore, purify, e.g., disinfect, water. For example, in one embodiment, the catalyst comprises an alumina substrate onto which is codeposited silver ("the first metal") and palladium ("the additional metal"). The electron accepting silver atoms complex with the lone electron pairs on oxygen (dissolved in the water) to function as an oxygen bridge. This oxygen bridge is a powerful reactive oxidative species, and is very unstable. The proton accepting palladium serves to stabilize the complex, thereby enhancing the ability of the catalyst to generate reactive oxygen species that kill microorganisms in water, or that convert harmful, toxic and/or reactive organic compounds contained in water to less harmful, less toxic and/or less reactive compounds.

Examples of metals codeposited on the substrate include transition metals, platinides, rare earth metals, and oxides of transition metals, platinides, and rare earth metals. In one embodiment, the first metal is silver. Silver, a transition metal, has already been shown previously to catalytically induce water disinfection by converting dissolved oxygen, and other available oxidizers, into reactive species which inactivate microorganisms.

The first metal is present in the catalyst in an amount greater than the amount of the additional metal. The amount of the first metal is selected such that the catalyst is capable of performing its intended function, e.g., disinfecting water. Generally, for example, the amount of the first metal, e.g., silver, is present in an amount ranging from about 0.1 % to about 10 %, about 0.25 % to about 5 %, or about 0.25% to about 3 %, or about 0.5% to about 3%, or about 0.5% to about 2%, or about 1.2% of the total weight of the catalyst.

The additional metals of the catalyst are selected, generally, for their ability to change their valence states, and effectively participate in the catalytic disinfection process of the water. Examples of additional metals include palladium, platinum, vanadium, and molybdenum. In one embodiment, at least one of the additional metals is present as its oxide.

The additional metals are present in the catalyst in an amount less than the amount of the first metal. The amount of the additional metals are selected such that the catalyst is capable of performing its intended function, e.g., disinfecting water. Generally, for example, the amount of an additional metal, e.g., palladium, is present in amounts about 1 ppm to about 100 ppm, about 1 ppm to about 75 ppm, about 1 ppm to about 60 ppm, about 1 ppm to about 50 ppm, about 1 ppm to about 40 ppm, about 1 ppm to about 30 ppm, about 1 ppm to about 20 ppm, about 1 to about 15 ppm, about 2 ppm to about 15 ppm, about 2 ppm to about 14 ppm, about 2 ppm to about 13 ppm, about 2 ppm to about 12 ppm, about 2 ppm to about 14 ppm, about 2 ppm to about 10 ppm, and about 1 ppm by total weight of the catalyst. In percent weight, the additional metal is present in the catalyst in an amount, generally, about $1\times10^{-4}$% to about $1\times10^{-2}$%, about $1\times10^{-4}$% to about $7.5\times10^{-3}$%, about $1\times10^{-4}$% to about $6\times10^{-3}$%, about $1\times10^{-4}$% to about $5.0\times10^{-3}$%, about $1\times10^{-4}$% to about $4.0\times10^{-3}$%, about $1\times10^{-4}$% to about $3.0\times10^{-3}$%, about $1\times10^{-4}$% to about $2.0\times10^{-3}$%, about $1\times10^{-4}$% to about $15\times10^{-4}$%, about $2\times10^{-4}$% to about $15\times10^{-4}$%, $2\times10^{-4}$% to about $14\times10^{-4}$%, about $2\times10^{-4}$% to about $13\times10^{-4}$%, about $2\times10^{-4}$% to about $12\times10^{-4}$%, about $2\times10^{-4}$% to about $11\times10^{-4}$%, about $2\times10^{-4}$% to about $10\times10^{-4}$%, and about $1\times10^{-3}$% of the total weight of the catalyst.

In a second embodiment, the metals of the catalyst are selected such that the catalyst has a redox potential which allows it to perform its intended function, e.g., disinfect water. The redox potential of the catalyst can be measured using standard techniques known in the art, such as using a DPD indicator in oxygen free distilled water. The catalyst of the invention preferably has a redox potential of 40 mV/g or greater, 50 mV/g or greater, 60 mV/g or greater, 70 mV/g or greater, 80 mV/g or greater, 90 mV/g or greater, 100 mV/g or greater, 110 mV/g or greater, 120 mV/g or greater, or, advantageously, 130 mV/g or greater. The redox potential of the catalysts of the invention are particularly surprising in comparison to the redox potential of conventional catalysts, such as those disclosed in U.S. Pat. No. 5,660,802, 4,504,287, 4,608,247, and 5,352,369. The catalysts disclosed in these patents have a redox potential of only about 30 mV/g which is ineffective to inactivate bacteria without additional support from other water disinfecting methods or agents.

The metals of the catalyst are advantageously selected such that the catalyst has a kill rate for bacteria such as 1,000 organisms/mL per fifteen seconds or more, 10,000 organisms/mL per fifteen seconds or more, 100,000 organisms/mL per fifteen second or more, or, advantageously, 1,000,000 organisms/mL per fifteen seconds or more. In a further embodiment, the kill rate of bacteria and/or other microorganisms meets or exceeds water safety standards, such as those published by AOAC International. The kill rates of the present invention are surprising over conventional silver on alumina catalysts used to disinfect water, because the conventional catalysts have a much lower kill rate(100 to about 1,000 organisms/mL per fifteen seconds), after a single pass over the catalyst. The conventional silver catalysts do not meet the AOAC, International standards, generally, and, hence, usually require additional purification methods or agents.

The catalyst of the invention may be formulated as a granular solid, as a fine powder, or as a wet slurry. The exact formulation will depend on the method and manner of manufacture, as well as the desired use of the catalyst.

III. Methods of the Invention

The invention also pertains to a method for purifying water. The method includes contacting the water with a catalyst of the invention, such that the water is purified. Without being bound or limited by theory, it is believed that the catalyst reacts with dissolved oxygen in the water to generate a highly reactive and powerful oxidative species.

Thus, in one embodiment, the invention is a method for disinfecting water. The disinfection of the water may comprise, advantageously, the killing or inactivation of bacteria, protozoa, viruses, fungi, and other pathogenic and non-pathogenic microorganisms.

In a further embodiment, the method may also comprise passing the water through one or more filters to remove other particles and contaminants which are not removed by interactions with the catalyst. For example, in yet another embodiment, the method further comprises passing the water through a charcoal filter before or after disinfection with the catalyst of the invention to remove non-bacterial contaminants present in the water.

In another embodiment, the disinfected water meets or exceeds water safety standards, such as those established by the AOAC, International, WHO and EPA. Preferably, the water disinfected by the methods of the invention do not require additional agents or purification steps to meet or exceed the requirements for inactivation of microorganisms in water supplies.

In an advantageous embodiment, the invention pertains to a method for inactivating bacteria in water. The method includes contacting the water with a catalyst. The catalyst comprises a substrate (e.g., alumina), a first metal (e.g., silver), and at least one additional metal (e.g., palladium). The metals are codeposited onto said substrate, such as to form a unified structure.

In yet another embodiment, the invention is a method for purifying water by converting harmful, toxic and/or reactive organic compounds contained in the water to less harmful, less toxic and/or less reactive compounds.

IV. Water purification Devices of the Invention

In another embodiment, the invention is directed to a device for purifying water. In a preferred embodiment, the device is used to disinfect water. The device comprises the catalyst of the invention, as described above. In another embodiment, the device further comprises a water inlet, a water outlet, and a housing containing the catalyst of the invention. The device may also include other filters and features which allow or enhance the ability of the device to perform its intended function, e.g., disinfect water. The device may include, in certain embodiments, one or more filters, such as charcoal filters, to remove impurities, particles, and other non-bacterial contaminants present in the water.

Figure 1B:
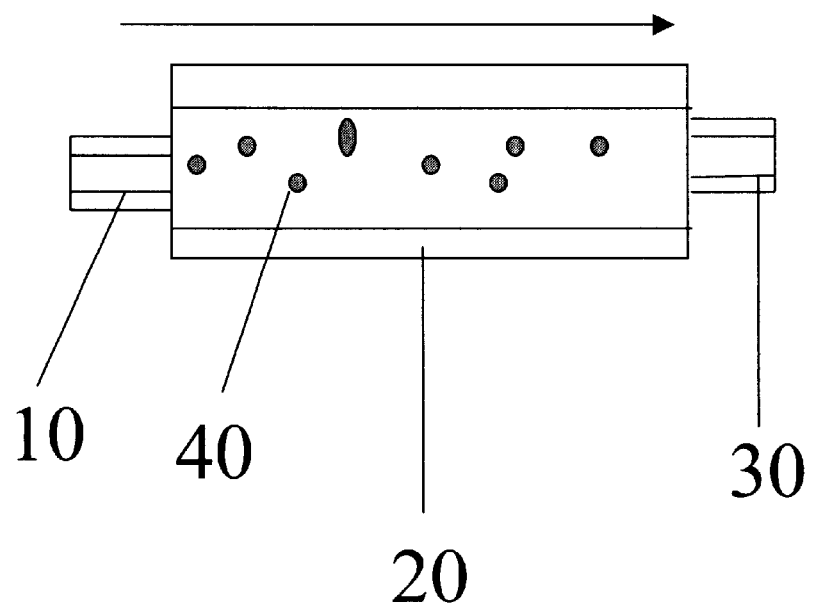

One embodiment of a water disinfecting device of the invention is shown in FIGS. 1A and 1B. In FIG. 1A, the water inlet (10) is connected to the housing (20), which is connected to the water outlet (30). The arrow indicates the direction of the flow of the water. FIG. 1B is a cutaway view of the device which shows that the catalyst (40) is located inside the housing (20). Water flows through the water inlet (10), to the housing (20) where it comes into contact with the catalyst (40). The water then exits the device through the water outlet (30).

In a further embodiment, the catalyst is incorporated into one or more filter beds. The undisinfected water is filtered through the beds and is disinfected when it comes into contact with the catalyst. The water can be purified by a single pass through the filter bed or through a series of filter beds. Alternatively, water can be recirculated through one or more filter beds repeatedly.

In another embodiment, the catalyst is deposited on the surface of a container, pipe, tube, or other another surface to which the water is exposed. The catalyst can completely coat the surface that the water comes into contact with, or it may only cover a portion of the surface the water contacts.

In another embodiment, the catalyst is incorporated into a capsule or packet which can be agitated within the water sample. For example, the catalyst is placed in a porous packet which is placed in the water to be disinfected and agitated, such that the water is disinfected. Advantageously, the porous package is portable.

In another embodiment, the device for water disinfection comprises a housing containing the catalyst, and a water inlet and a water outlet, through which water can flow. In one embodiment, the device is suitable for home use. For example, the device may be constructed so that it can be attached to a faucet, hose, spigot, well or other home or farm water source such that the water is immediately purified through the device before being consumed or used. In an embodiment, the device is constructed such that it is portable and suitable for travel. In a further embodiment, the device is designed such that it is suitable for farm use. For example, the device is advantageously designed such that it can disinfect water for use in animal drinking troughs.

In another embodiment, the water disinfection device is suitable for killing bacteria and other microorganisms located in a confined area of water, such as a pool, spa, hot tub, pond, etc. Examples of water purification devices know in the art include those described in U.S. Pat. Nos. 5,660, 802, and 4,504,387, which are expressly incorporated herein by reference.

The water purifier of U.S. Pat. No. 5,660,802 comprises a water inlet, a water outlet, and a purification unit that kills the bacteria in the water. It can be used for killing bacteria in a confined area of water in accordance with the methods of the invention by replacing its conventional catalyst with the catalyst of the invention.

U.S. Pat. No. 4,504,387 discloses a water purification system for use with a pool or the like in which a small quantity of water is continually withdrawn from the pool and recycled and disinfected. This water purification system can also be improved by substituting its conventional catalyst with the catalyst of the present invention.

In a further embodiment, the water purification device is suitable for large scale purification of water, e.g., municipal water sources.

The invention also pertains to a packaged catalyst for the disinfection of water. The packaged catalyst includes the catalyst of the invention, a suitable container for the catalyst (e.g., a flow-through bag, a box, a vial, etc.), and instructions for using the catalyst for the disinfection of water.

Exemplification of the Invention

The invention is further illustrated by the following examples that should not be construed as limiting.

EXAMPLE 1

A batch of water purification catalyst was prepared by reducing silver and palladium salts on a bed of alumina substrate.

Alumina (1,000 g) (Alcoa CPN 8–14 mesh) was used as the substrate. Eighteen grams of silver nitrate (99.95% commercial grade) and 2.5 milligrams of palladium nitrate (Fisher Scientific AS standard grade) were thoroughly mixed with the alumina substrate. The silver nitrate and the palladium nitrate were coreduced to a metallic coating on the alumina substrate by aqueous phase reducing agents at ambient temperature. The resulting material was then dried for 3 hours at 450° F.

The efficacy of the catalyst was then measured and compared with a conventional silver catalyst.

A sample of *E. coli* (ATCC#25922) was incubated at 37° C. on Tryptic Soy Agar (Difco) and harvested. The bacteria were diluted to a working concentration of $10^5$ to $10^6$ organisms per milliliter in buffer solution. The buffer solution consisted of tap water previously dechlorinated with sodium thiosulfate, buffered to a pH of 7.2 with phosphate buffer.

The bacterial solution was pumped at 19 liters/min through a control catalyst bed which contained 200 grams of silver/alumina catalyst. The silver/alumina catalyst can be prepared by the method outlined above. The bacterial solution was also pumped at the same velocity through a catalyst bed which contained 200 grams of the silver/palladium/alumina catalyst. Samples of the water were collected after discharge from each of the catalyst beds.

The samples were then assayed for viable bacteria using the membrane filtration test as described in 'Standard Methods for the Examination of Water and Wastewater.' ($17^{th}$ ed. 1989, American Public Health Association (APHA), American Water Works Association (AWWA), Water Pollution Control Federation (WPCF)). Temperature and dissolved oxygen were consistently maintained during the experiments.

The results from the experiment are shown in Table 1. The samples used for the table were drawn 60 seconds into the pumping cycle.

TABLE 1

| | | E. coli Concentration | |
| --- | --- | --- | --- |
| Dilution | Initial Concentration | After Exposure to Alumina/Silver Catalyst | After Exposure to Alumina/Silver/ Palladium Catalyst |
| 1:100,000 | 57 | 0 | 0 |
| 1:10,000 | >300 | 4 | 0 |
| 1:1,000 | NR | 53 | 0 |
| 1:100 | NR | >300 | 7 |
| 1:10 | NR | NR | 62 |

Samples were also evaluated with the palladium/silver/alumina catalyst after 30 and 120 second pumping periods. No significant variation was found compared to the 60 second pumping period sample (sample dilution of 1:1000 showed 1 cfu (colony forming unit) at 30 seconds and 0 cfu at both 60 and 120 seconds).

The results indicate the alumina/silver/palladium catalyst has an improved efficiency for killing *E. coli* of at least a factor of ten over the previously known silver/alumina catalyst.

EXAMPLE 2

This example shows that changing the ratio of the metals on the catalyst affects the ability of the catalyst to inactivate the bacteria. The amount of palladium in the catalyst was increased from 2.5 mg/kg in the previous example to 10 mg/kg. A catalyst which contained only silver and alumina was used as the control. The catalyst was prepared using the same method as given in Example 1.

Table 2 shows data from kill studies using *E. coli* and the Standard Methods membrane filtration methodology used in Example 1.

TABLE 2

| Dilution | Initial Concentration | Control | Pd Catalyst |
| --- | --- | --- | --- |
| 1:100,000 | 230 | 4 | <1 |
| 1:1,000 | TNTC | 294 | <1 |
| 1:1,000 | TNTC | NR | <1 |
| 1:100 | NR | TNTC | <1 |
| 1:100 | NR | NR | <1 |
| 1:10 | NR | NR | <1 |

NR = Not recorded
TNTC = Too numerous to count.

NR=Not recorded TNTC=Too numerous to count.

The tables show that the alumina/silver/palladium catalyst of the invention has high kill rates of *E coli* that are capable of being duplicated in separate experiments. For each of the dilutions, the catalyst was able to kill effectively all the bacteria present in contrast to the known catalyst.

EXAMPLE 3

Table 3 below represents the results of four replicates of bacterial kill studies using the catalyst of Example 2. The results were consistent among the four replicates; i. e., no live bacteria were detected in water samples treated with the catalyst of Example 2.

In each of the replicate studies, bacteria were introduced from 2, 24 hour Tryptic Soy Agar slants into a container with 20 liters of dechlorinated tap water and a pump. The water temperature was 30° C. The start sample was drawn directly from the water in the container with a pipette. A sample was then drawn from the container using the pump without the catalyst in place. The water was pumped through the catalyst bed at a rate of about 19 liters per minute. The second sample was then drawn from the container using the pump with the catalyst in place. The results are as shown in Table 3. All values are given as colony forming units (cfu) per 100ml of sample. TNTC stands for too numerous to count. <1 is statistically 0.

TABLE 3

| Dilution | Start | Control (w/o catalyst) | With Catalyst |
| --- | --- | --- | --- |
| 1:1,000,000 | 511 cfu | NR | NR |
| 1:100 | TNTC | TNTC | <1 |
| 1:10 | NR | TNTC | <1 |
| 1:1 | NR | TNTC | <1 |

Table 3 shows that the catalyst was effective to kill essentially all the bacteria present in the container. The water purified by the palladium/silver/alumina catalyst used in Examples 2 and 3 meets the standards for water purity issued by the EPA and the WHO at each dilution.

Incorporation by Reference

The entire contents of all patents, published patent applications and other references cited herein are hereby expressly incorporated herein in their entireties by reference.

Equivalents

Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A catalyst for purifying water comprising a substrate, a first metal, and at least one additional metal, wherein said first metal and said additional metal are codeposited onto said substrate.

2. The catalyst of claim 1, wherein said purifying comprises disinfecting said water by killing of microorganisms contained therein.

3. The catalyst of claim 1, wherein said substrate is a metal oxide.

4. The catalyst of claim 3, wherein said substrate is alumina.

5. The catalyst of claim 1, wherein said first metal is selected from the group consisting of transition metals, platinides, rare earth metals, and oxides of transition metals, platinides, or rare earth metals.

6. The catalyst of claim 5, wherein said first metal is a transition metal.

7. The catalyst of claim 6, wherein said first metal is copper, silver or gold.

8. The catalyst of claim 7, wherein said first metal is silver.

9. The catalyst of claim 1, wherein said purification comprises converting harmful, toxic and/or reactive organic compounds contained in the water to less harmful, less toxic and/or less reactive compounds.

10. The catalyst of claim 1, wherein said additional metal is selected from the group consisting of transition metals, platinides, rare earth metals, and oxides of transition metals, platinides, or rare earth metals.

11. The catalyst of claim 10, wherein said additional metal is a transition metal.

12. The catalyst of claim 11, wherein said additional metal is platinum, palladium, molybdenum, or vanadium.

13. The catalyst of claim 12, wherein said additional metal is palladium.

14. The catalyst of claim 10, wherein said additional metal is an oxide of a transition metal, a platinide, or a rare earth metal.

15. The catalyst of claim 1, wherein said first metal is an oxide of a transition metal, a platinide, or a rare earth metal.

16. The catalyst of claim 15, further comprising one or more additional metal oxides.

17. The catalyst of claim 1, wherein said catalyst has a redox potential of 100 mV/mg or greater.

18. The catalyst of claim 17, wherein said catalyst has a redox potential of 120 mV/mg or greater.

19. The catalyst of claim 18, wherein said catalyst has a redox potential of 130 mV/mg or greater.

20. A catalyst for purifying water comprising a substrate, silver, and palladium, wherein palladium and silver are codeposited onto said substrate and wherein said palladium and said silver form a unified structure on the surface of said substrate.

21. The catalyst of claim 20, wherein said substrate is a metal oxide.

22. The catalyst of claim 21, wherein said substrate is alumina.

23. The catalyst of claim 20, wherein silver comprises about 0.1% to about 3.0% of the weight of the catalyst.

24. The catalyst of claim 23 wherein silver comprises about 0.5% to about 3.0% of the weight of the catalyst.

25. The catalyst of claim 24, wherein silver comprises about 0.5% to about 2.0% of the weight of the catalyst.

26. The catalyst of claim 25, wherein silver comprises about 1.2% of the catalyst.

27. The catalyst of claim 20, wherein palladium comprises about $1 \times 10^{-4}$ to about $1 \times 10^{-2}$% of the weight of the catalyst.

28. The catalyst of claim 27, wherein palladium comprises about $1 \times 10^{-4}$ to about $6 \times 10^{-3}$% of the weight of the catalyst.

29. The catalyst of claim 28, wherein palladium comprises about $1 \times 10^{-4}$ to about $5 \times 10^{-3}$% of the weight of the catalyst.

30. The catalyst of claim 29, wherein palladium comprises about $1 \times 10^{-4}$ to about $2 \times 10^{-3}$% of the weight of the catalyst.

31. A device for purifying water comprising a catalyst, wherein said catalyst comprises a substrate, a first metal, and at least one additional metal, wherein said first metal and said additional metal are codeposited onto said substrate.

32. The device of claim 31 which further comprises a filter, wherein said filter contains said catalyst.

33. The device of claim 31, wherein said purifying comprises disinfecting said water by killing of microorganisms contained therein.

34. The device of claim 33, wherein said catalyst comprises an alumina substrate, silver, and palladium, wherein said silver and said palladium are codeposited onto said substrate.

35. The device of claim 33, wherein said device is portable.

36. The device of claim 31, which further comprises a housing surrounding said catalyst, a water inlet and a water outlet.

37. A packaged catalyst for the disinfection of water comprising a catalyst, a container for said catalyst, and instructions for using said catalyst for the disinfection water, wherein said catalyst comprises a substrate, a first metal, and at least one additional metal, wherein said first metal and said additional metal are codeposited onto said substrate.

* * * * *